(12) United States Patent
Yang

(10) Patent No.: US 10,700,879 B2
(45) Date of Patent: Jun. 30, 2020

(54) CHARGING METHOD AND DEVICE, ACCESS DEVICE, SERVICE QUALITY CONTROL METHOD AND DEVICE

(71) Applicant: Huawei Technologies Co., Ltd., Shenzhen (CN)

(72) Inventor: Enfeng Yang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 15/411,631

(22) Filed: Jan. 20, 2017

(65) Prior Publication Data

US 2017/0134177 A1   May 11, 2017

Related U.S. Application Data

(63) Continuation of application No. PCT/CN2015/075984, filed on Apr. 7, 2015.

(30) Foreign Application Priority Data

Jul. 23, 2014   (CN) .......................... 2014 1 0352743

(51) Int. Cl.
*H04L 12/14* (2006.01)
*H04L 12/24* (2006.01)
(Continued)

(52) U.S. Cl.
CPC .......... *H04L 12/14* (2013.01); *H04L 12/1407* (2013.01); *H04L 41/5019* (2013.01);
(Continued)

(58) Field of Classification Search
CPC . H04L 12/14; H04L 41/5019; H04L 12/1407; H04L 65/4084; H04L 69/22; H04L 12/1467; H04M 15/00; H04M 15/66
See application file for complete search history.

(56) References Cited

U.S. PATENT DOCUMENTS 9,660,818 B2 * 5/2017 Castro Castro ..... H04L 41/0893
2003/0103520 A1   6/2003 Chen et al.
(Continued)

FOREIGN PATENT DOCUMENTS

CN   101098293 A   1/2008
CN   101257394 A   9/2008
(Continued)

OTHER PUBLICATIONS

Vitalis G. Ozianyi et al., "Optimized IP-CANs to Support Best Charged IMS Scenarios" IEEE 20th International Symposium on Personal, Indoor and Mobile Radio Communications (PIMRC 2009), IEEE, Piscataway, NJ, USA, Sep. 13, 2009, pp. 572-576.

*Primary Examiner* — Ajay Cattungal
(74) *Attorney, Agent, or Firm* — Slater Matsil, LLP

(57) ABSTRACT

Embodiments disclose a charging method and device. In present embodiments, according to an application identifier carried in a content request, an application indicated by the application identifier is learned, and it is learned that the content request is triggered by using the application. In this way, according to the embodiments of the present embodiments, a charging request indicating traffic generated by requested content and the foregoing application may be sent to a charging device.

25 Claims, 7 Drawing Sheets

(51) Int. Cl.
*H04W 4/24* (2018.01)
*H04M 15/00* (2006.01)
*H04L 29/06* (2006.01)

(52) U.S. Cl.
CPC .......... *H04L 65/4084* (2013.01); *H04L 69/22* (2013.01); *H04M 15/00* (2013.01); *H04M 15/66* (2013.01); *H04W 4/24* (2013.01); *H04L 12/1467* (2013.01)

(56) References Cited

U.S. PATENT DOCUMENTS

| | | | |
|---|---|---|---|
| 2009/0307312 A1 | 12/2009 | Ramaswamy | |
| 2010/0010922 A1* | 1/2010 | Foottit | G06Q 10/00 705/30 |
| 2011/0161216 A1* | 6/2011 | Ahlgren | G06Q 20/102 705/34 |
| 2011/0265133 A1 | 10/2011 | Kure | |
| 2012/0088469 A1* | 4/2012 | Cai | H04M 15/00 455/406 |
| 2012/0101952 A1* | 4/2012 | Raleigh | H04M 15/66 705/304 |
| 2012/0136992 A1* | 5/2012 | Lopez Nieto | H04L 12/1407 709/224 |
| 2012/0140750 A1* | 6/2012 | Yan | H04N 21/43615 370/338 |
| 2012/0278229 A1 | 11/2012 | Vishwanathan et al. | |
| 2013/0054378 A1 | 2/2013 | Hao et al. | |
| 2013/0101103 A1* | 4/2013 | Dun | H04L 12/14 379/114.01 |
| 2013/0316674 A1* | 11/2013 | Cho | H04L 12/1407 455/406 |
| 2014/0204756 A1 | 7/2014 | Higashino et al. | |
| 2014/0359710 A1* | 12/2014 | Chaput | H04M 15/67 726/4 |
| 2014/0376412 A1* | 12/2014 | Li | H04L 43/028 370/259 |
| 2015/0003298 A1* | 1/2015 | Cai | H04M 15/60 370/259 |
| 2015/0003299 A1 | 1/2015 | Li | |
| 2015/0039601 A1* | 2/2015 | Harrang | G06F 16/9535 707/727 |
| 2015/0236862 A1* | 8/2015 | Castro Castro | H04L 12/1407 370/259 |
| 2015/0271344 A1* | 9/2015 | Bertze | H04M 15/888 455/408 |
| 2016/0164752 A1* | 6/2016 | Larsson | H04M 15/61 455/408 |
| 2016/0373588 A1* | 12/2016 | Raleigh | H04M 15/61 |
| 2017/0134177 A1* | 5/2017 | Yang | H04L 12/14 |

FOREIGN PATENT DOCUMENTS

| | | |
|---|---|---|
| CN | 102811135 A | 12/2012 |
| CN | 103220158 A | 7/2013 |
| CN | 103684803 A | 3/2014 |
| CN | 104053140 A | 9/2014 |
| EP | 2824963 A1 | 1/2015 |
| JP | 2003169363 A | 6/2003 |
| JP | 2009033269 A | 2/2009 |
| JP | 2009049517 A | 3/2009 |
| JP | 2013058994 A | 3/2013 |
| WO | 2013108136 A1 | 7/2013 |
| WO | 2013133676 A1 | 9/2013 |

\* cited by examiner

CHARGING METHOD AND DEVICE, ACCESS DEVICE, SERVICE QUALITY CONTROL METHOD AND DEVICE

CROSS-REFERENCE TO RELATED APPLICATIONS

This application is a continuation of International Application No. PCT/CN2015/075984, filed on Apr. 7, 2015, which claims priority to Chinese Patent Application No. 201410352743.5, filed on Jul. 23, 2014. The disclosures of the aforementioned applications are hereby incorporated by reference in their entireties.

TECHNICAL FIELD

The present embodiments relates to the charging and service quality control technologies, and in particular, to a charging method and device, an access device, a service quality control method and device.

BACKGROUND

With rapid development of network transmission technologies, content that can be provided by using the Internet is increasingly rich. For example, a user can read news, listen to music, and watch a movie by using the Internet. By using a latest network transmission technology, content provided by a content provider site (that is, a content source) can be transmitted to a user terminal with an extremely short delay.

Through strengthened cooperation with a content provider, a telecommunications operator has developed a new charging mode. The telecommunications operator can develop a special traffic package for the cooperative content provider. By subscribing to this type of traffic package, all traffic generated when a user obtains content from the content provider site is separately counted into the foregoing traffic package. In a specific implementation process, the telecommunications operator may analyze a content request sent by the user, so as to obtain information about the content provider site. For example, the telecommunications operator may analyze an IP (internet protocol) address to which the content request points, so as to determine a site to which the content request points, that is, the content provider site. In this way, the content provider can be determined according to the content provider site. In addition, because the content request generally includes a URL (uniform resource locator) of requested content, the telecommunications operator may determine the content provider site by analyzing the URL, so as to determine the content provider according to the content provider site. In this way, the telecommunications operator can count traffic generated by the requested content into a traffic package to which the user subscribes from the content provider.

With rapid popularization of a mobile terminal, an increasing number of service providers provide services to a user by using dedicated software installed on the mobile terminal. This type of dedicated software is generally referred to as an application (App), which is developed by a service provider. By using this type of application, the user can conveniently enjoy a service provided by the service provider. Among numerous applications, a social application is most popular. This type of application not only can implement instant messaging between a user and a friend, but also can help the user view, at any time, various information shared by the friend.

By imitating the traffic package specially developed for the content provider, the telecommunications operator has also developed a corresponding traffic package for the social application. According to an initial idea of the telecommunications operator, by using this traffic package, all traffic generated when the user enjoys a service (such as instant messaging) and accesses content (such as information shared by the friend) by using the social application is counted into the traffic package that is set for the social application and to which the user subscribes. However, in a use process, the user finds that the traffic generated by using the social application is not completely counted into the corresponding traffic package. A root cause of this problem lies in that not all content accessed by the user by using the applications of a social category is provided by a service provider site that provides the applications of a social category, that is, not all access requests for the foregoing content point to the service provider site that provides the social application.

The following describes the cause of the foregoing problem by using an example of a process in which the user accesses, by using a WeChat™ application provided by Tencent™, content shared by the friend. A friend circle function provided by the WeChat™ allows the user to access the content shared by the friend, such as an article, a picture, a song, and a movie. When sharing a clip of video content, the friend can inset an access portal of the video content into the friend circle, and the access portal may be presented as a video playing window in a friend circle window. When the user taps a playing button on the video playing window, the WeChat™ requests the video content from a content provider site that provides the video content, and plays the obtained video content in the foregoing video playing window. However, the content provider that provides the foregoing video content may not be the service provider Tencent™ that develops the WeChat™; therefore, an access request for the foregoing video content may not point to a site of Tencent™. For example, when a friend shares video content provided by Youku™ in a friend circle of the WeChat™, although the user requests the video content by using the WeChat™, the video content is still provided by a site of Youku™ (not the site of Tencent™). In this way, when the user taps the playing button, the WeChat requests the foregoing video content from the site of Youku™, instead of requesting the foregoing video content from the site of the Tencent™. However, from the perspective of the user, because the user watches the video content in the video window in the window of the friend circle of the WeChat™ (that is, the user is not out of the WeChat™ application when watching the video content), traffic generated by the video content should be counted into a traffic package corresponding to the WeChat™.

It can be learned that according to an existing charging technology, traffic generated when the user accesses the content by using the social application may not be necessarily counted into the traffic package corresponding to the social application.

SUMMARY

In view of this, it is necessary to provide a charging method, so that traffic generated when content is accessed by using an application can be counted into a traffic package corresponding to the application.

Further, an access device is provided, so that traffic generated when content is accessed by using an application can be counted into a traffic package corresponding to the application.

Further, a charging device is provided, so that traffic generated when content is accessed by using an application can be counted into a traffic package corresponding to the application.

Further, a service quality control method is provided, so that service quality applied to an application is applicable to content accessed by using the application.

Further, a service quality control method is provided, so that accumulated traffic of an application can be updated by using traffic generated when content is accessed by using the application as traffic generated by the application, and service quality of the application is determined according to the updated accumulated traffic.

Further, an access device is provided, so that service quality applied to an application is applicable to content accessed by using the application.

Further, a service quality control device is provided, so that accumulated traffic of an application can be updated by using traffic generated when content is accessed by using the application as traffic generated by the application, and service quality of the application is determined according to the updated accumulated traffic.

According to a first aspect, a charging method is provided, including receiving a content request, where the content request carries a content identifier and an application identifier, the content identifier is used to identify requested content, and the application identifier is used to identify an application and identify that the content request is triggered by using the application. The charging method also includes returning the content and determining traffic generated by the content and sending, to a charging device, a charging request indicating the traffic and the application, so that the charging device charges the traffic as traffic generated by the application.

With reference to a first possibility of the first aspect, the charging request is a credit control request (CCR), and the application is indicated by a service identifier carried in the credit control request.

With reference to a second possibility of the first aspect, the charging request is a CCR, and the application is indicated by an application parameter carried in the credit control request.

With reference to a third possibility of the second possibility, the traffic is indicated by a used service unit (USU) carried in the credit control request, and the credit control request further carries a service identifier used to indicate the content, so that the charging device generates a consumption record according to the application, the content, and the traffic, where the consumption record is used to indicate that the traffic is generated by the content, the content is requested by using the application, and the traffic is charged as the traffic generated by the application.

With reference to a fourth possibility of the second possibility, the method further includes determining a content source of the content; and the traffic is indicated by a USU carried in the credit control request, and the credit control request further carries a service identifier used to indicate the content source, so that the charging device generates a consumption record according to the application, the content source, and the traffic, where the consumption record is used to indicate that the traffic is generated when the content source is accessed, access to the content source is triggered by using the application, and the traffic is charged as the traffic generated by the application.

According to a second aspect, a charging method is provided, where the method is used to charge traffic generated by content that is requested by using an application, and includes receiving a charging request that indicates the application and the traffic and that is sent by an access device and charging the traffic as traffic generated by the application.

With reference to a first possibility of the second aspect, the charging request is a CCR, and the application is indicated by an application parameter carried in the credit control request.

With reference to a second possibility of the first possibility, the traffic is indicated by a USU carried in the credit control request, the credit control request further carries a service identifier used to indicate the content, and the method further includes generating a consumption record according to the application, the content, and the traffic, where the consumption record is used to indicate that the traffic is generated by the content, the content is requested by using the application, and the traffic is charged as the traffic generated by the application.

With reference to a third possibility of the first possibility, the traffic is indicated by a USU carried in the credit control request, the credit control request further carries a service identifier used to indicate a content source of the content, and the method further includes generating a consumption record according to the application, the content source, and the traffic, where the consumption record is used to indicate that the traffic is generated when the content source is accessed, access to the content source is triggered by using the application, and the traffic is charged as the traffic generated by the application.

According to a third aspect, an access device is provided, including: a receiving module, configured to receive a content request, where the content request carries a content identifier and an application identifier, the content identifier is used to identify requested content, and the application identifier is used to identify an application and identify that the content request is triggered by using the application; a returning module, configured to return the content and determine traffic generated by the content; and a charging module, configured to send, to a charging device, a charging request indicating the traffic and the application, so that the charging device charges the traffic as traffic generated by the application.

With reference to a first possibility of the third aspect, the charging request is a CCR, and the application is indicated by a service identifier carried in the credit control request.

With reference to a second possibility of the third aspect, the charging request is a CCR, and the application is indicated by an application parameter carried in the credit control request.

With reference to a third possibility of the second possibility, the traffic is indicated by a USU carried in the credit control request, and the credit control request further carries a service identifier used to indicate the content, so that the charging device generates a consumption record according to the application, the content, and the traffic, where the consumption record is used to indicate that the traffic is generated by the content, the content is requested by using the application, and the traffic is charged as the traffic generated by the application.

With reference to a fourth possibility of the second possibility, the device further includes a determining module, configured to determine a content source of the content;

and the traffic is indicated by a USU carried in the credit control request, and the credit control request further carries a service identifier used to indicate the content source, so that the charging device generates a consumption record according to the application, the content source, and the traffic, where the consumption record is used to indicate that the traffic is generated when the content source is accessed, access to the content source is triggered by using the application, and the traffic is charged as the traffic generated by the application.

According to a fourth aspect, a charging device is provided, where the device is configured to charge traffic generated by content that is requested by using an application, and includes: a receiving module, configured to receive a charging request that indicates the application and the traffic and that is sent by an access device; and a charging module, configured to charge the traffic as traffic generated by the application.

With reference to a first possibility of the fourth aspect, the charging request is a CCR, and the application is indicated by an application parameter carried in the credit control request.

With reference to a second possibility of the first possibility, the traffic is indicated by a USU carried in the credit control request, the credit control request further carries a service identifier used to indicate the content, and the device further includes a generating module, configured to generate a consumption record according to the application, the content, and the traffic, where the consumption record is used to indicate that the traffic is generated by the content, the content is requested by using the application, and the traffic is charged as the traffic generated by the application.

With reference to a third possibility of the first possibility, the traffic is indicated by a USU carried in the credit control request, the credit control request further carries a service identifier used to indicate a content source of the content, and the device further includes a generating module, configured to generate a consumption record according to the application, the content source, and the traffic, where the consumption record is used to indicate that the traffic is generated when the content source is accessed, access to the content source is triggered by using the application, and the traffic is charged as the traffic generated by the application.

According to a fifth aspect, a service quality control method is provided, including: receiving a content request, where the content request carries a content identifier and an application identifier, the content identifier is used to identify requested content, and the application identifier is used to identify an application and identify that the content request is triggered by using the application; determining service quality corresponding to the application; and returning the content according to the service quality.

With reference to a first possibility of the fifth aspect, the method further includes: determining traffic generated by the content; sending, to a service quality control device, a service quality control request indicating the traffic and the application, so that the service quality control device updates accumulated traffic of the application by using the traffic as traffic generated by the application; and receiving service quality that is returned by the service quality control device and that is determined according to the updated accumulated traffic.

With reference to a second possibility of the first possibility, the service quality control request is a CCR, and the application is indicated by a service identifier carried in the credit control request.

With reference to a third possibility of the first possibility, the service quality control request is a CCR, and the application is indicated by an application parameter carried in the credit control request.

According to a sixth aspect, a service quality control method is provided, where the method is used to determine service quality of an application, where a request for content is triggered by using the application, and the method includes: receiving a service quality control request that indicates traffic generated by the content and the application and that is sent by an access device; updating accumulated traffic of the application by using the traffic as traffic generated by the application; determining the service quality of the application according to the updated accumulated traffic; and returning the determined service quality.

With reference to a first possibility of the sixth aspect, the service quality control request is a CCR, and the application is indicated by an application parameter carried in the credit control request.

According to a seventh aspect, an access device is provided, including: a content request receiving module, configured to receive a content request, where the content request carries a content identifier and an application identifier, the content identifier is used to identify requested content, and the application identifier is used to identify an application and identify that the content request is triggered by using the application; a service quality determining module, configured to determine service quality corresponding to the application; and a returning module, configured to return the content according to the service quality.

With reference to a first possibility of the seventh aspect, the device further includes: a traffic determining module, configured to determine traffic generated by the content; a sending module, configured to send, to a service quality control device, a service quality control request indicating the traffic and the application, so that the service quality control device updates accumulated traffic of the application by using the traffic as traffic generated by the application; and a service quality receiving module, configured to receive service quality that is returned by the service quality control device and that is determined according to the updated accumulated traffic.

With reference to a second possibility of the first possibility, the service quality control request is a CCR, and the application is indicated by a service identifier carried in the credit control request.

With reference to a third possibility of the first possibility, the service quality control request is a CCR, and the application is indicated by an application parameter carried in the credit control request.

According to an eighth aspect, a service quality control device is provided, where the device is configured to determine service quality of an application, where a request for content is triggered by using the application, and the device includes: a receiving module, configured to receive a service quality control request that indicates traffic generated by the content and the application and that is sent by an access device; an update module, configured to update accumulated traffic of the application by using the traffic as traffic generated by the application; a determining module, configured to determine the service quality of the application according to the updated accumulated traffic; and a returning module, configured to return the determined service quality.

With reference to a first possibility of the eighth aspect, the service quality control request is a CCR, and the application is indicated by an application parameter carried in the credit control request.

In the embodiments, according to an application identifier carried in a content request, an application indicated by the application identifier is learned, and it is learned that the content request is triggered by using the application. In this way, according to the embodiments, a charging request indicating traffic generated by requested content and the foregoing application may be sent to a charging device, thereby achieving a purpose of charging, by the charging device, the foregoing traffic as traffic generated by the foregoing application.

DETAILED DESCRIPTION OF ILLUSTRATIVE EMBODIMENTS

Figure 1:
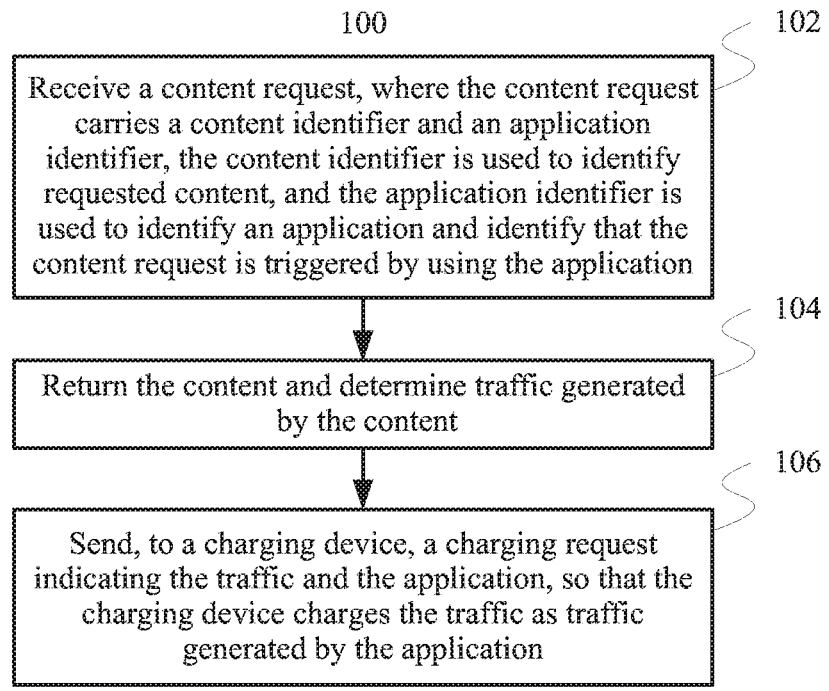
FIG. 1 is an exemplary flowchart of a charging method according to an embodiment.

FIG. 1 is an exemplary flowchart of a charging method 100 according to an embodiment. In a specific implementation process, the charging method 100 may be executed by, for example, but not limited to, an access device. The foregoing access device may be, for example, but not limited to, a GGSN (Gateway GPRS (General Packet Radio Service) Support Node).

Step 102: Receive a content request, where the content request carries a content identifier and an application identifier, the content identifier is used to identify requested content, and the application identifier is used to identify an application and identify that the content request is triggered by using the application.

Specifically, the foregoing content request is from, for example, but not limited to, a user terminal, such as various mobile terminals. More specifically, the foregoing content request is triggered by using an application running on the user terminal. The foregoing content identifier may be, for example, but not limited to, a uniform resource locator (URL) that is of content and that is carried in the content request, or information that is obtained from the URL and that may be used to identify the foregoing content.

Step 104: Return the content and determine traffic generated by the content.

Step 106: Send, to a charging device, a charging request indicating the traffic and the application, so that the charging device charges the traffic as traffic generated by the application.

Specifically, the charging request may be a credit control request (CCR), and the application is indicated by a service identifier carried in the credit control request. In this case, the service identifier carries information used to indicate the application, such as the foregoing application identifier, instead of carrying information used to indicate the content, such as the foregoing content identifier.

In another implementation solution, the charging request is also a credit control request. However, the application is indicated by an application parameter carried in the credit control request. The application parameter is a newly added parameter, and the parameter carries information used to indicate the application, such as the foregoing application identifier.

It can be learned that when the charging request is a credit control request, the foregoing application may be indicated in the credit control request in two manners. A first manner is that the foregoing application is indicated by the service identifier carried in the credit control request, and a second manner is that the foregoing application is indicated by the application parameter carried in the credit control request. It is not difficult to understand that because the service identifier exists in an existing credit control request, the existing credit control request does not need to be modified in the first manner. However, in the second manner, because the application parameter is a newly added parameter, the existing credit control request needs to be modified.

When the charging request is a credit control request and the application is indicated by the application parameter carried in the credit control request, the traffic is indicated by a used service unit (USU) carried in the credit control request. In this case, the credit control request further carries a service identifier used to indicate the content, so that the charging device generates a consumption record according to the application, the content, and the traffic, where the consumption record is used to indicate that the traffic is generated by the content, the content is requested by using the application, and the traffic is charged as the traffic generated by the application. It should be noted that in this case, the service identifier carries information used to indicate the content, such as the foregoing content identifier, instead of carrying information used to indicate the application, such as the foregoing application identifier.

The service identifier carried in the credit control request may be further used to indicate a content source of the content, instead of the content. In this case, the charging device may generate another consumption record. Specifically, when the charging request is a credit control request and the application is indicated by the application parameter carried in the credit control request, the method 100 may further include determining a content source of the content. In this case, the traffic is indicated by a USU carried in the credit control request, and the credit control request further carries a service identifier used to indicate the content source, so that the charging device generates a consumption record according to the application, the content source, and the traffic, where the consumption record is used to indicate that the traffic is generated when the content source is accessed, access to the content source is triggered by using the application, and the traffic is charged as the traffic generated by the application. It should be noted that in this case, the service identifier carries information used to indicate the content source of the content, such as a name and a domain name of the content source, instead of carrying information used to indicate the application, such as the foregoing application identifier, or instead of carrying information used to indicate the content, such as the foregoing content identifier. In a specific implementation process, the content source of the content may be determined according to an internet protocol (IP) address to which the content request points. In addition, because the content request generally includes a URL of requested content, the content source may also be determined by analyzing the URL.

In a specific implementation process, that the charging device charges the traffic as traffic generated by the application in step 106 indicates that the charging device counts the traffic into a traffic package corresponding to the application. It can be learned that because the traffic is counted into the traffic package corresponding to the application, instead of being counted into a traffic package that corresponds to a content provider corresponding to the content, a purpose of charging the foregoing traffic as the traffic generated by the foregoing application can be achieved in the present embodiments.

For a charging device, a specific operation of the device, and specific details related to the charging device and its operation, detailed description is given below with reference to FIG. 2 to FIG. 6.

In this embodiment, according to an application identifier carried in a content request, an application indicated by the application identifier is learned, and it is learned that the content request is triggered by using the application. In this way, according to this embodiment, a charging request indicating traffic generated by requested content and the foregoing application may be sent to a charging device, thereby achieving a purpose of charging, by the charging device, the foregoing traffic as traffic generated by the foregoing application.

Figure 2:
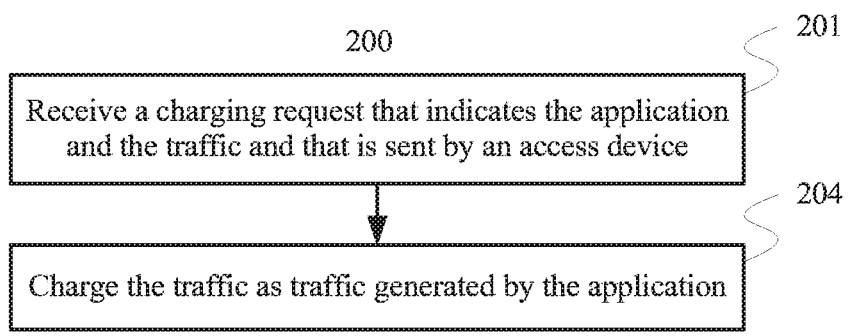
FIG. 2 is an exemplary flowchart of a charging method according to an embodiment.

FIG. 2 is an exemplary flowchart of a charging method 200 according to an embodiment. The charging method 200 shown in FIG. 2 is used to charge traffic generated by content that is requested by using an application. In a specific implementation process, the charging method 200 may be executed by, for example, but not limited to, a charging device. The foregoing charging device may be, for example, but not limited to, an OCS (online charging system).

Step 202: Receive a charging request that indicates the application and the traffic and that is sent by an access device.

Specifically, the charging request is a credit control request (CCR), and the application is indicated by an application parameter carried in the credit control request. The application parameter is a newly added parameter, and the parameter carries information used to indicate the application, such as the foregoing application identifier. It is not difficult to understand that because the application parameter is a newly added parameter, an existing credit control request needs to be modified.

For an access device, a specific operation of the device, and specific details related to the access device and its operation, detailed description has been given above with reference to FIG. 1. Furthermore, further description is also given below with reference to FIG. 3 to FIG. 6.

Step 204: Charge the traffic as traffic generated by the application.

In a specific implementation process, charging the traffic as traffic generated by the application in step 204 indicates that the traffic is counted into a traffic package corresponding to the application. It can be learned that because the traffic is counted into the traffic package corresponding to the application, instead of being counted into a traffic package that corresponds to a content provider corresponding to the content, a purpose of charging the foregoing traffic as the traffic generated by the foregoing application can be achieved in the present embodiments.

When the charging request is a CCR and the application is indicated by an application parameter carried in the credit control request, the traffic is indicated by a USU carried in the credit control request, and the credit control request further carries a service identifier used to indicate the content. In this case, the method 200 further includes generating a consumption record according to the application, the content, and the traffic, where the consumption record is used to indicate that the traffic is generated by the content, the content is requested by using the application, and the traffic is charged as the traffic generated by the application.

The service identifier carried in the credit control request may be further used to indicate a content source of the content, instead of the content. In this case, the charging device may generate another consumption record. Specifically, when the charging request is CCR and the application is indicated by an application parameter carried in the credit control request, the traffic is indicated by a USU carried in the credit control request, and the credit control request further carries a service identifier used to indicate a content source of the content. In this case, the method 200 may further include generating a consumption record according to the application, the content source, and the traffic, where the consumption record is used to indicate that the traffic is generated when the content source is accessed, access to the content source is triggered by using the application, and the traffic is charged as the traffic generated by the application.

In this embodiment, according to an application identifier carried in a content request, an application indicated by the application identifier is learned, and it is learned that the content request is triggered by using the application. In this way, according to this embodiment, a charging request indicating traffic generated by requested content and the foregoing application may be sent to a charging device, thereby achieving a purpose of charging, by the charging device, the foregoing traffic as traffic generated by the foregoing application.

Figure 3:
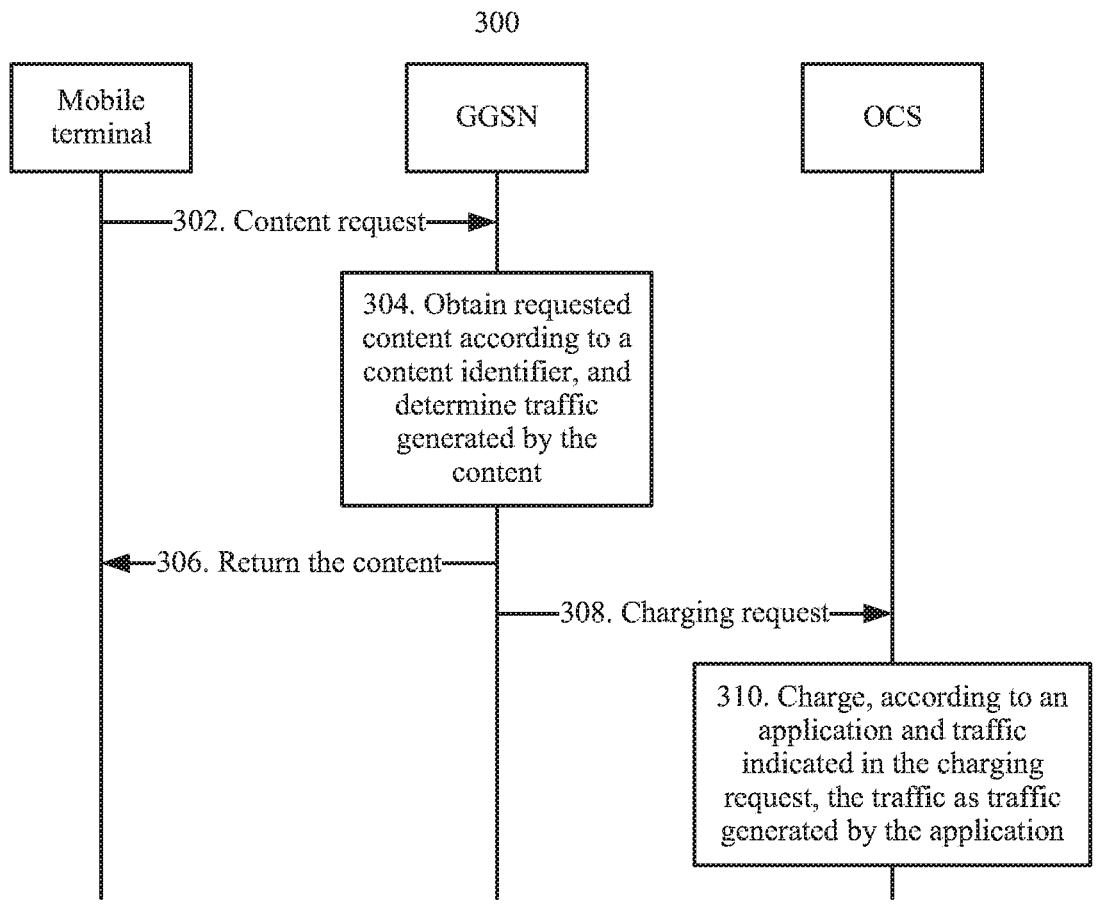
FIG. 3 is an exemplary signaling diagram of a charging method according to an embodiment.

FIG. 3 is an exemplary signaling diagram of a charging method 300 according to an embodiment. A mobile terminal shown in FIG. 3 may be, for example, but not limited to, a computing device having an Internet access function, such as a personal digital assistant, a smartphone, a tablet computer, and the like. An application runs on the mobile terminal, and a user may trigger a content request by using the application, so as to access content. A GGSN corresponds to the access device in the method 100 and the method 200. An OCS corresponds to the charging device in the method 100 and the method 200.

Step 302: The user triggers a content request by using the application running on the mobile terminal, where the content request carries a content identifier and an application identifier, the content identifier is used to identify requested content, and the application identifier is used to identify an application and identify that the content request is triggered by using the application. For details about technical features of the content request, the content identifier, the application identifier, and the like, detailed description has been given above with reference to the method 100 and the method 200; therefore, details are not described herein again.

Step 304: The GGSN obtains the requested content according to the content identifier, and determines traffic generated by the content.

Step 306: The GGSN returns the requested content to the mobile terminal.

Step 308: The GGSN sends, to the charging device, a charging request indicating the foregoing traffic and the foregoing application.

For details about technical features of the charging request, and the like, detailed description has been given above with reference to the method 100 and the method 200; therefore, details are not described herein again.

Step 310: The charging device charges, according to the application and the traffic indicated in the charging request, the traffic as traffic generated by the application, that is, the charging device counts the traffic into a traffic package corresponding to the application.

For details about a charging process, detailed description has been given above with reference to the method 100 and the method 200; therefore, details are not described herein again.

In a specific implementation process, a sequence of some steps in the method 300 may be set according to a specific requirement. For example, an operation of determining the traffic generated by the content in step 304 may be performed after step 306 and before step 308.

In addition, the method 300 may further include a step of generating a consumption record. For content related to consumption record generation, detailed description has been given above with reference to the method 100 and the method 200; therefore, details are not described herein again.

As described above, the GGSN in the method 300 described with reference to FIG. 3 corresponds to the access device in the method 100 and the method 200. The OCS corresponds to the charging device in the method 100 and the method 200. For each type of device, a specific operation of each type of device, and specific details related to each type of device and its operation, detailed description has been given above with reference to FIG. 1 and FIG. 2. Furthermore, further description is also given below with reference to FIG. 4 to FIG. 6.

Figure 4:
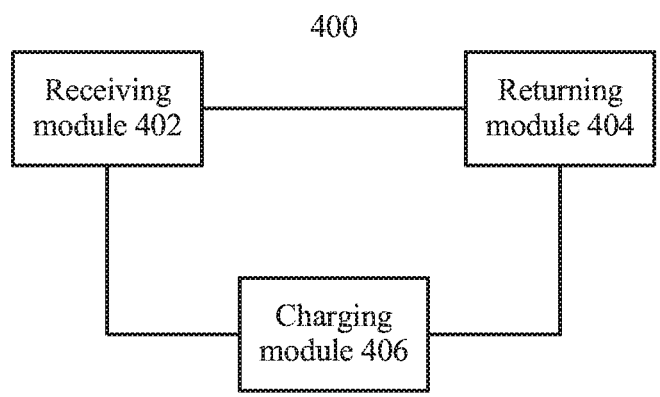
FIG. 4 is an exemplary schematic diagram of a logical structure of an access device according to an embodiment.

FIG. 4 is an exemplary schematic diagram of a logical structure of an access device 400 according to an embodiment. As shown in FIG. 4, the access device 400 includes a receiving module 402, a returning module 404, and a charging module 406.

The receiving module 402 is configured to receive a content request, where the content request carries a content identifier and an application identifier, the content identifier is used to identify requested content, and the application identifier is used to identify an application and identify that the content request is triggered by using the application.

The returning module 404 is configured to return the content and determine traffic generated by the content.

The charging module 406 is configured to send, to a charging device, a charging request indicating the traffic and the application, so that the charging device charges the traffic as traffic generated by the application.

Specifically, the foregoing content request is from, for example, but not limited to, a user terminal, such as various mobile terminals. More specifically, the foregoing content request is triggered by using an application running on the user terminal. The foregoing content identifier may be, for example, but not limited to, a URL that is of content and that is carried in the content request, or information that is obtained from the URL by the receiving module 402 and that may be used to identify the foregoing content.

In addition, the charging request may be a credit control request (CCR), and the application is indicated by a service identifier carried in the credit control request. In this case, the service identifier carries information used to indicate the application, such as the foregoing application identifier, instead of carrying information used to indicate the content, such as the foregoing content identifier.

In another implementation solution, the charging request is also a CCR. However, the application is indicated by an application parameter carried in the credit control request. The application parameter is a newly added parameter, and the parameter carries information used to indicate the application, such as the foregoing application identifier.

It can be learned that when the charging request is a CCR, the foregoing application may be indicated in the credit control request in two manners. A first manner is that the foregoing application is indicated by the service identifier carried in the credit control request, and a second manner is that the foregoing application is indicated by the application parameter carried in the credit control request. It is not difficult to understand that because the service identifier exists in an existing credit control request, the existing credit control request does not need to be modified in the first manner. However, in the second manner, because the application parameter is a newly added parameter, the existing credit control request needs to be modified.

When the charging request is a CCR and the application is indicated by an application parameter carried in the credit control request, the traffic is indicated by a USU carried in the credit control request. In this case, the credit control request further carries a service identifier used to indicate the content, so that the charging device generates a consumption record according to the application, the content, and the traffic, where the consumption record is used to indicate that the traffic is generated by the content, the content is requested by using the application, and the traffic is charged as the traffic generated by the application. It should be noted that in this case, the service identifier carries information used to indicate the content, such as the foregoing content identifier, instead of carrying information used to indicate the application, such as the foregoing application identifier.

The service identifier carried in the credit control request may be further used to indicate a content source of the content, instead of the content. In this case, the charging device may generate another consumption record. Specifically, when the charging request is a CCR and the application is indicated by an application parameter carried in the credit control request, the access device 400 may further include a determining module (not shown in FIG. 4), configured to determine a content source of the content. In this case, the traffic is indicated by a USU carried in the credit control request, and the credit control request further carries a service identifier used to indicate the content source, so that the charging device generates a consumption record according to the application, the content source, and the traffic, where the consumption record is used to indicate that the traffic is generated when the content source is accessed, access to the content source is triggered by using the application, and the traffic is charged as the traffic generated by the application. It should be noted that in this case, the service identifier carries information used to indicate the content source of the content, such as a name and a domain name of the content source, instead of carrying information used to indicate the application, such as the foregoing application identifier, or instead of carrying information used to indicate the content, such as the foregoing content identifier. In a specific implementation process, the determining module may determine the content source of the content according to an IP address to which the content request points. In addition, because the content request generally includes a URL of requested content, the determining module may also determine the content source by analyzing the URL.

In a specific implementation process, that the foregoing charging device charges the traffic as traffic generated by the application indicates that the charging device counts the traffic into a traffic package corresponding to the application. It can be learned that because the traffic is counted into the traffic package corresponding to the application, instead of being counted into a traffic package that corresponds to a content provider corresponding to the content, a purpose of charging the foregoing traffic as the traffic generated by the foregoing application can be achieved in the present embodiments.

The access device 400 shown in FIG. 4 is configured to execute the method 100 shown in FIG. 1. For the access device and its operation, and technical details related to the access device and its operation, description is given in the method 200 shown in FIG. 2 and the method 300 shown in FIG. 3. Furthermore, further description is also given below with reference to FIG. 5 and FIG. 6.

In this embodiment, according to an application identifier carried in a content request, an application indicated by the application identifier is learned, and it is learned that the content request is triggered by using the application. In this way, according to this embodiment, a charging request indicating traffic generated by requested content and the foregoing application may be sent to a charging device, thereby achieving a purpose of charging, by the charging device, the foregoing traffic as traffic generated by the foregoing application.

Figure 5:
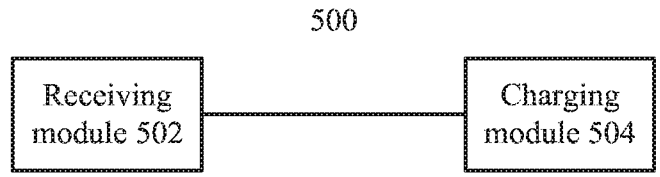
FIG. 5 is an exemplary schematic diagram of a logical structure of a charging device according to an embodiment.

FIG. 5 is an exemplary schematic diagram of a logical structure of a charging device 500 according to an embodiment. The charging device 500 shown in FIG. 5 is configured to charge traffic generated by content that is requested by using an application. As shown in FIG. 5, the charging device 500 includes a receiving module 502 and a charging module 504.

The receiving module 502 is configured to receive a charging request that indicates the application and the traffic and that is sent by an access device.

Specifically, the charging request is a CCR, and the application is indicated by an application parameter carried in the credit control request. The application parameter is a newly added parameter, and the parameter carries information used to indicate the application, such as the foregoing application identifier. It is not difficult to understand that because the application parameter is a newly added parameter, an existing credit control request needs to be modified.

The charging module 504 is configured to charge the traffic as traffic generated by the application.

In a specific implementation process, when the traffic is charged as the traffic generated by the application, the charging module 504 is specifically configured to count the traffic into a traffic package corresponding to the application. It can be learned that because the traffic is counted into the traffic package corresponding to the application, instead of being counted into a traffic package that corresponds to a content provider corresponding to the content, a purpose of charging the foregoing traffic as the traffic generated by the foregoing application can be achieved in the present embodiments.

When the charging request is a CCR and the application is indicated by an application parameter carried in the credit control request, the traffic is indicated by a USU carried in the credit control request, and the credit control request further carries a service identifier used to indicate the content. In this case, the charging device 500 may further include a generating module (not shown in FIG. 5), configured to generate a consumption record according to the application, the content, and the traffic, where the consumption record is used to indicate that the traffic is generated by the content, the content is requested by using the application, and the traffic is charged as the traffic generated by the application.

The service identifier carried in the credit control request may be further used to indicate a content source of the content, instead of the content. Therefore, another consumption record may be generated. Specifically, when the charging request is a CCR and the application is indicated by an application parameter carried in the credit control request, the traffic is indicated by a USU carried in the credit control request, and the credit control request further carries a service identifier used to indicate a content source of the content. In this case, the charging device 500 may further include a generating module (not shown in FIG. 5), configured to generate a consumption record according to the application, the content source, and the traffic, where the consumption record is used to indicate that the traffic is generated when the content source is accessed, access to the content source is triggered by using the application, and the traffic is charged as the traffic generated by the application.

The charging device 500 shown in FIG. 5 is configured to execute the method 200 shown in FIG. 2. For the charging device and its operation, and technical details related to the charging device and its operation, description is given in the method 100 shown in FIG. 1, the method 300 shown in FIG. 3, and the device 400 shown in FIG. 4. Furthermore, further description is also given below with reference to FIG. 6.

In this embodiment, according to an application identifier carried in a content request, an application indicated by the application identifier is learned, and it is learned that the content request is triggered by using the application. In this way, according to this embodiment, a charging request indicating traffic generated by requested content and the foregoing application may be sent to a charging device, thereby achieving a purpose of charging, by the charging device, the foregoing traffic as traffic generated by the foregoing application.

Figure 6:
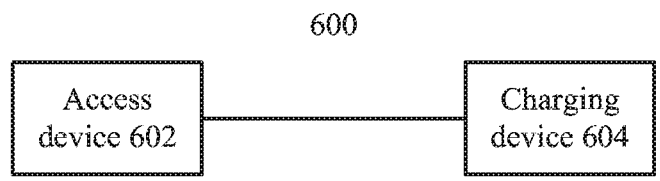
FIG. 6 is an exemplary schematic diagram of a logical structure of a charging system according to an embodiment.

FIG. 6 is an exemplary schematic diagram of a logical structure of a charging system 600 according to an embodiment. As shown in FIG. 6, the charging system 600 includes an access device 602 and a charging device 604.

The access device 602 is configured to: receive a content request, where the content request carries a content identifier and an application identifier, the content identifier is used to identify requested content, and the application identifier is used to identify an application and identify that the content request is triggered by using the application; return the content and determine traffic generated by the content; and send, to the charging device 604, a charging request indicating the traffic and the application.

The charging device 604 is configured to receive the charging request that indicates the application and the traffic and that is sent by the access device 602, and charge the traffic as traffic generated by the application.

Specifically, the charging request may be a credit control request, and the application is indicated by a service identifier carried in the credit control request. In this case, the service identifier carries information used to indicate the application, such as the foregoing application identifier, instead of carrying information used to indicate the content, such as the foregoing content identifier.

In another implementation solution, the charging request is also a CCR. However, the application is indicated by an application parameter carried in the credit control request. The application parameter is a newly added parameter, and the parameter carries information used to indicate the application, such as the foregoing application identifier.

It can be learned that when the charging request is a CCR, the foregoing application may be indicated in the credit control request in two manners. A first manner is that the foregoing application is indicated by the service identifier carried in the credit control request, and a second manner is that the foregoing application is indicated by the application parameter carried in the credit control request. It is not difficult to understand that because the service identifier exists in an existing credit control request, the existing credit control request does not need to be modified in the first manner. However, in the second manner, because the application parameter is a newly added parameter, the existing credit control request needs to be modified.

When the charging request is a CCR and the application is indicated by the application parameter carried in the credit control request, the traffic is indicated by a used service unit (USU) carried in the credit control request. In this case, the credit control request further carries a service identifier used to indicate the content, so that the charging device 604 may generate a consumption record according to the application, the content, and the traffic, where the consumption record is used to indicate that the traffic is generated by the content, the content is requested by using the application, and the traffic is charged as the traffic generated by the application. It should be noted that in this case, the service identifier carries information used to indicate the content, such as the foregoing content identifier, instead of carrying information used to indicate the application, such as the foregoing application identifier.

The service identifier carried in the credit control request may be further used to indicate a content source of the content, instead of the content. In this case, the charging device 604 may generate another consumption record. Specifically, when the charging request is a CCR and the application is indicated by the application parameter carried in the credit control request, the access device 602 is further configured to determine a content source of the content. In this case, the traffic is indicated by a USU carried in the credit control request, and the credit control request further carries a service identifier used to indicate the content source, so that the charging device 604 generates a consumption record according to the application, the content source, and the traffic, where the consumption record is used to indicate that the traffic is generated when the content source is accessed, access to the content source is triggered by using the application, and the traffic is charged as the traffic generated by the application. It should be noted that in this case, the service identifier carries information used to indicate the content source of the content, such as a name and a domain name of the content source, instead of carrying information used to indicate the application, such as the foregoing application identifier, or instead of carrying information used to indicate the content, such as the foregoing content identifier. In a specific implementation process, the access device 602 may determine the content source of the content according to an IP address to which the content request points. In addition, because the content request generally includes a URL of requested content, the access device 602 may also determine the content source by analyzing the URL.

In a specific implementation process, that the charging device 604 charges the traffic as the traffic generated by the application indicates that the charging device 604 counts the traffic into a traffic package corresponding to the application. It can be learned that because the traffic is counted into the traffic package corresponding to the application, instead of being counted into a traffic package that corresponds to a content provider corresponding to the content, a purpose of charging the foregoing traffic as the traffic generated by the foregoing application can be achieved in the present embodiments.

The access device 602 is configured to execute the method 100 shown in FIG. 1. For the device and its operation, and specific details related to the device and its operation, description is also given in FIG. 2 to FIG. 5. Therefore, details are not described herein again.

The charging device 604 is configured to execute the method 200 shown in FIG. 2. For the device and its operation, and specific details related to the device and its operation, description is also given in FIG. 1 and FIG. 3 to FIG. 5. Therefore, details are not described herein again.

In this embodiment, according to an application identifier carried in a content request, an application indicated by the application identifier is learned, and it is learned that the content request is triggered by using the application. In this way, according to this embodiment, a charging request indicating traffic generated by requested content and the foregoing application may be sent to a charging device, thereby achieving a purpose of charging, by the charging device, the foregoing traffic as traffic generated by the foregoing application.

Figure 7:
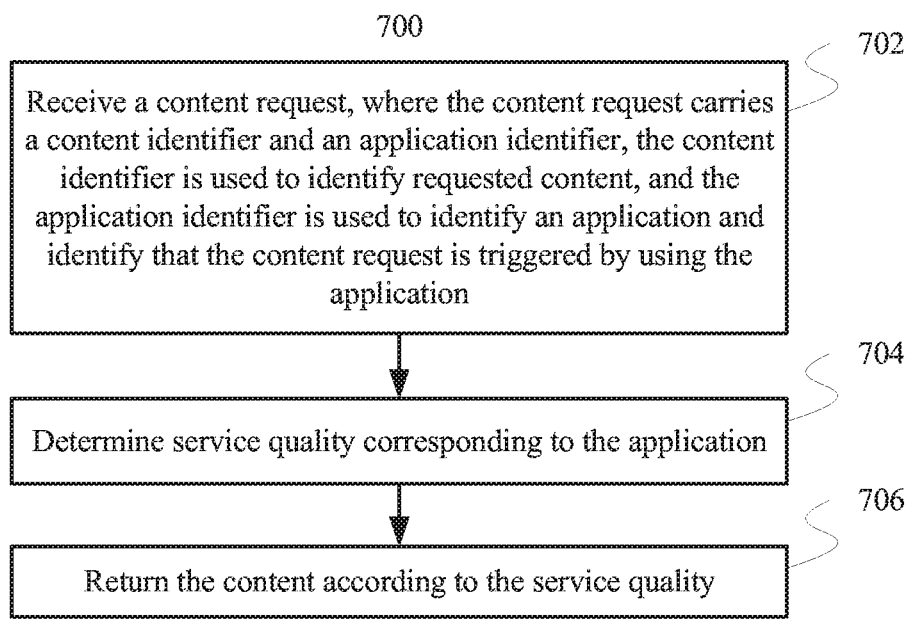
FIG. 7 is an exemplary flowchart of a service quality control method according to an embodiment.

FIG. 7 is an exemplary flowchart of a service quality control method 700 according to an embodiment. In a specific implementation process, the service quality control method 700 may be executed by, for example, but not limited to, an access device, where the access device may be, for example, but not limited to, a GGSN.

Step 702: Receive a content request, where the content request carries a content identifier and an application identifier, the content identifier is used to identify requested content, and the application identifier is used to identify an application and identify that the content request is triggered by using the application.

Specifically, the foregoing content identifier may be, for example, but not limited to, a URL that is of content and that is carried in the content request, or information that is obtained from the URL and that may be used to identify the foregoing content. In addition, the content request, the content identifier, and the application identifier described in this embodiment are the content request, the content identifier, and the application identifier described in FIG. 1 to FIG. 6.

Step 704: Determine service quality corresponding to the application.

Step 706: Return the content according to the service quality.

In a specific implementation process, the method 700 may further include: determining traffic generated by the content; sending, to a service quality control device, a service quality control request indicating the traffic and the application, so that the service quality control device updates accumulated traffic of the application by using the traffic as traffic generated by the application; and receiving service quality that is returned by the service quality control device and that is determined according to the updated accumulated traffic.

Specifically, the service quality control request may be a credit control request (CCR), and the application is indicated by a service identifier carried in the credit control request. In this case, the service identifier carries information used to indicate the application, such as the foregoing application identifier, instead of carrying information used to indicate the content, such as the foregoing content identifier.

In another implementation solution, the service quality control request is also a CCR. However, the application is indicated by an application parameter carried in the credit control request. The application parameter is a newly added parameter, and the parameter carries information used to indicate the application, such as the foregoing application identifier.

It can be learned that when the service quality control request is a CCR, the foregoing application may be indicated in the credit control request in two manners. A first manner is that the foregoing application is indicated by the service identifier carried in the credit control request, and a second manner is that the foregoing application is indicated by the application parameter carried in the credit control request. It is not difficult to understand that because the service identifier exists in an existing credit control request, the existing credit control request does not need to be modified in the first manner. However, in the second manner, because the application parameter is a newly added parameter, the existing credit control request needs to be modified.

In a specific implementation process, the service quality control device may return the determined service quality by using a credit control answer (CCA).

For a service quality control device, a specific operation of the device, and specific details related to the service quality control device and its operation, detailed description is given below with reference to FIG. 8 to FIG. 12.

In this embodiment, according to an application identifier carried in a content request, an application indicated by the application identifier is learned, and it is learned that the content request is triggered by using the application. In this way, according to this embodiment, service quality applied to the application may be used when the foregoing content is returned.

In addition, according to this embodiment, by reporting, to a service quality control device, a service quality control request indicating traffic generated by requested content and the foregoing application, the traffic generated by the requested content may be counted into accumulated traffic of the application as traffic generated by the application, so as to implement update of the accumulated traffic of the application. In this way, the service quality control device may determine the service quality of the foregoing application according to the updated accumulated traffic, and return the determined service quality of the application to an access device.

Figure 8:
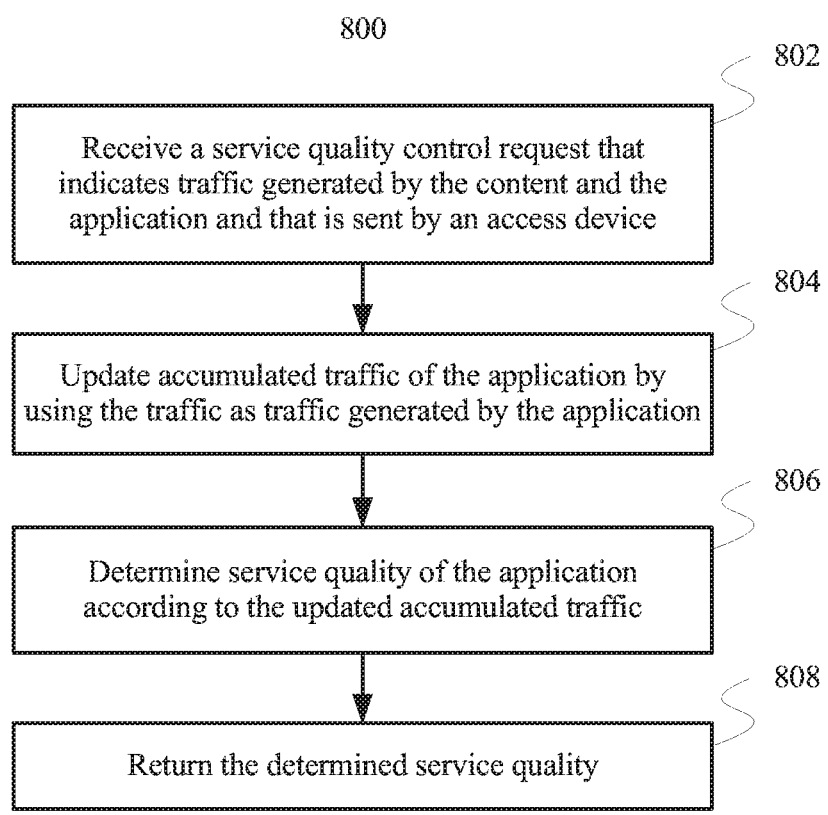
FIG. 8 is an exemplary flowchart of a service quality control method according to an embodiment.

FIG. 8 is an exemplary flowchart of a service quality control method 800 according to an embodiment. The service quality control method 800 shown in FIG. 8 is used to determine service quality of an application, where a request for content is triggered by using the application. In a specific implementation process, the service quality control method 800 may be executed by, for example, but not limited to, a service quality control device, where the service quality control device may be, for example, but not limited to, a PCRF (policy and charging rules function). In addition, the content and the application described in this embodiment are the content and the application described in FIG. 1 to FIG. 6.

Step 802: Receive a service quality control request that indicates traffic generated by the content and the application and that is sent by an access device.

In a specific implementation process, the service quality control request is a CCR, and the application is indicated by an application parameter carried in the credit control request. The application parameter is a newly added parameter, and the parameter carries information used to indicate the application, such as the foregoing application identifier. It is not difficult to understand that because the application parameter is a newly added parameter, an existing credit control request needs to be modified.

For an access device, a specific operation of the device, and specific details related to the access device and its operation, detailed description has been given above with reference to FIG. 7. Further description is given below with reference to FIG. 9 to FIG. 12.

Step 804: Update accumulated traffic of the application by using the traffic as traffic generated by the application.

Step 806: Determine the service quality of the application according to the updated accumulated traffic.

Step 808: Return the determined service quality.

In a specific implementation process, the service quality control device may return the updated service quality by using a credit control answer CCA.

According to this embodiment, by reporting, to a service quality control device, a service quality control request indicating traffic generated by requested content and the foregoing application, the traffic generated by the requested content may be counted into accumulated traffic of the application as traffic generated by the application, so as to implement update of the accumulated traffic of the application. In this way, the service quality control device may determine the service quality of the foregoing application according to the updated accumulated traffic, and return the determined service quality of the application to an access device.

Figure 9:
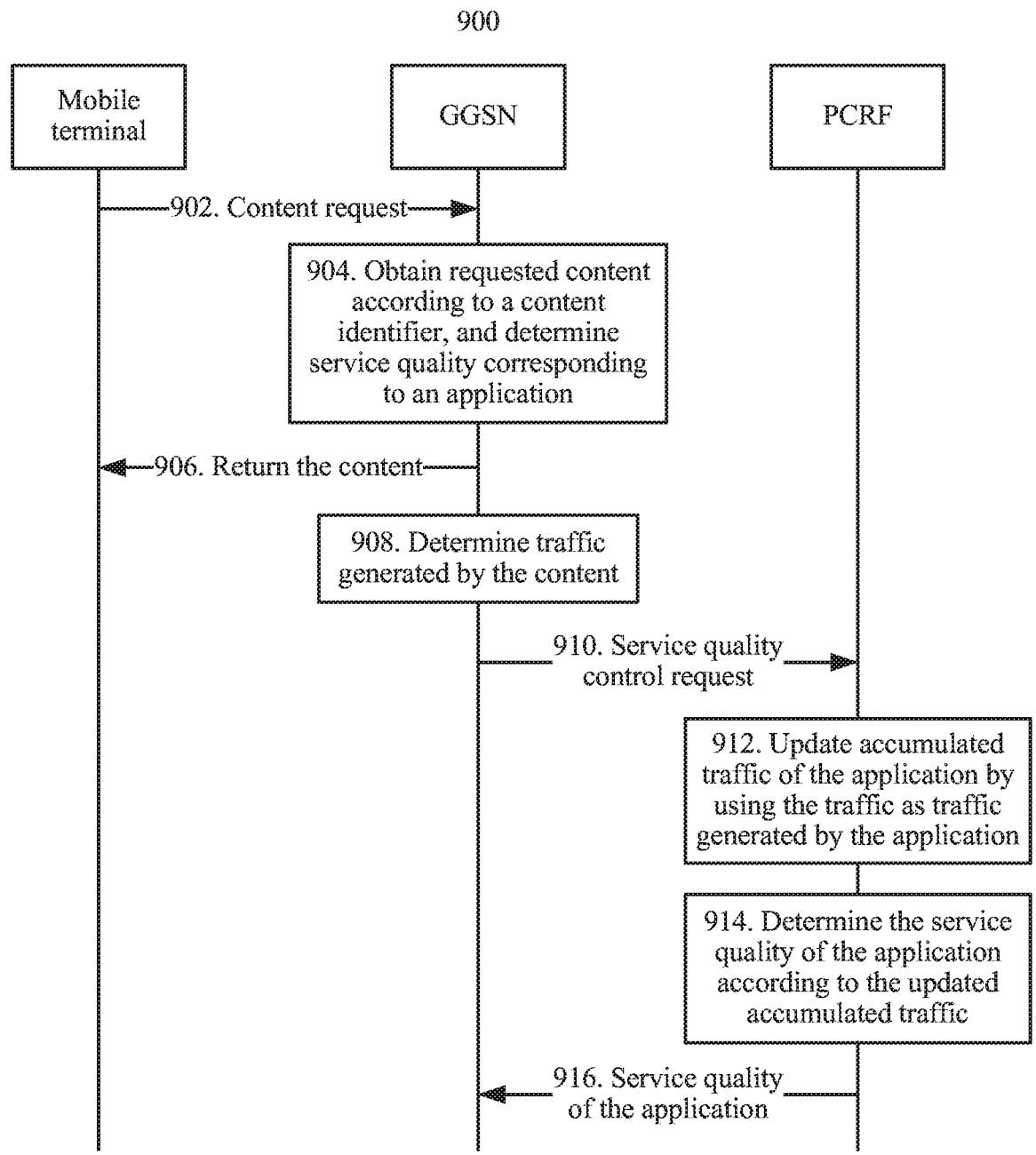
FIG. 9 is an exemplary signaling diagram of a service quality control method according to an embodiment.

FIG. 9 is an exemplary signaling diagram of a service quality control method 900 according to an embodiment. A mobile terminal shown in FIG. 9 may be, for example, but not limited to, a computing device having an Internet access function, such as a personal digital assistant, a smartphone, a tablet computer, and the like. An application runs on the mobile terminal, and a user may trigger a content request by using the application, so as to access content. A GGSN corresponds to the access device in the method 700 and the method 800. A PCRF corresponds to the service quality control device in the method 700 and the method 800.

Step 902: The user triggers a content request by using the application running on the mobile terminal, where the content request carries a content identifier and an application identifier, the content identifier is used to identify requested content, and the application identifier is used to identify an application and identify that the content request is triggered by using the application. For details about technical features of the content request, the content identifier, the application identifier, and the like, detailed description has been given above with reference to the method 700 and the method 800. Therefore, details are not described herein again.

Step 904: The GGSN obtains the requested content according to the content identifier, and determines service quality corresponding to the application.

Step 906: The GGSN returns the requested content to the mobile terminal according to the service quality corresponding to the application.

Step 908: The GGSN determines traffic generated by the content.

Step 910: The GGSN sends, to the PCRF, a service quality control request indicating the traffic and the application.

For details about technical features of the service quality control request, and the like, detailed description has been given above with reference to the method 700 and the method 800. Therefore, details are not described herein again.

Step 912: The PCRF updates, according to the application and the traffic indicated in the service quality control request, accumulated traffic of the application by using the traffic as traffic generated by the application.

Step 914: The PCRF determines the service quality of the application according to the updated accumulated traffic.

Step 916: The PCRF returns the determined service quality to the GGSN.

In a specific implementation process, a sequence of some steps in the method 900 may be set according to a specific requirement. For example, step 908 may be executed after step 904 and before step 906.

As described above, the GGSN in the method 900 described with reference to FIG. 9 corresponds to the access device in the method 700 and the method 800. The PCRF corresponds to the service quality control device in the method 700 and the method 800. For each type of device, a specific operation of each type of device, and specific details related to each type of device and its operation, detailed description has been given above with reference to FIG. 7 and FIG. 8. Further description is given below with reference to FIG. 10 to FIG. 12.

Figure 10:
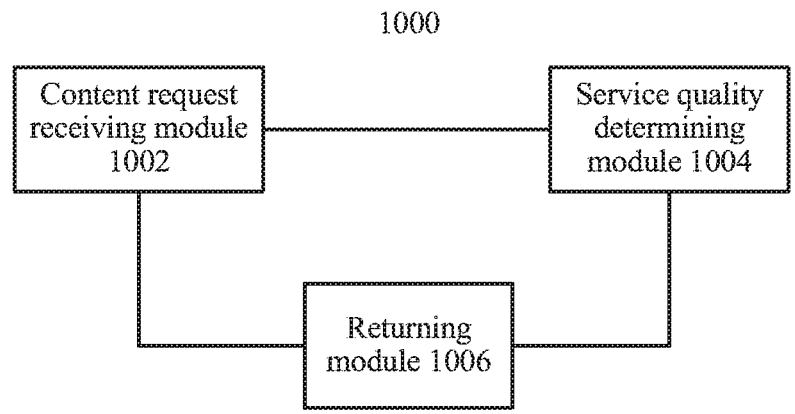
FIG. 10 is an exemplary schematic diagram of a logical structure of an access device according to an embodiment.

FIG. 10 is an exemplary schematic diagram of a logical structure of an access device 1000 according to an embodiment. As shown in FIG. 10, the access device 1000 includes a content request receiving module 1002, a service quality determining module 1004, and a returning module 1006.

The content request receiving module 1002 is configured to receive a content request, where the content request carries a content identifier and an application identifier, the content identifier is used to identify requested content, and the application identifier is used to identify an application and identify that the content request is triggered by using the application.

Specifically, the foregoing content identifier may be, for example, but not limited to, a URL that is of content and that is carried in the content request, or information that is obtained from the URL by the content request receiving module 1002 and that may be used to identify the foregoing content. In addition, the content request, the content identifier, and the application identifier described in this embodiment are the content request, the content identifier, and the application identifier described in FIG. 1 to FIG. 6.

The service quality determining module 1004 is configured to determine service quality corresponding to the application.

The returning module 1006 is configured to return the content according to the service quality.

In a specific implementation process, the access device 1000 may further include: a traffic determining module (not shown in FIG. 10), configured to determine traffic generated by the content; a sending module (not shown in FIG. 10), configured to send, to a service quality control device, a service quality control request indicating the traffic and the application, so that the service quality control device updates accumulated traffic of the application by using the traffic as traffic generated by the application; and a service quality receiving module (not shown in FIG. 10), configured to receive service quality that is returned by the service quality control device and that is determined according to the updated accumulated traffic.

Specifically, the service quality control request may be a credit control request (CCR), and the application is indicated by a service identifier carried in the credit control request. In this case, the service identifier carries information used to indicate the application, such as the foregoing application identifier, instead of carrying information used to indicate the content, such as the foregoing content identifier.

In another implementation solution, the service quality control request is also a CCR. However, the application is indicated by an application parameter carried in the credit control request. The application parameter is a newly added parameter, and the parameter carries information used to indicate the application, such as the foregoing application identifier.

It can be learned that when the service quality control request is a CCR, the foregoing application may be indicated in the credit control request in two manners. A first manner is that the foregoing application is indicated by the service identifier carried in the credit control request, and a second manner is that the foregoing application is indicated by the application parameter carried in the credit control request. It is not difficult to understand that because the service identifier exists in an existing credit control request, the existing credit control request does not need to be modified in the first manner. However, in the second manner, because the application parameter is a newly added parameter, the existing credit control request needs to be modified.

In a specific implementation process, the service quality control device may return the updated service quality by using a credit control answer (CCA).

The access device 1000 shown in FIG. 10 is configured to execute the method 700 shown in FIG. 7. For the access device and its operation, and technical details related to the access device and its operation, description is also given in the method 800 shown in FIG. 8 and the method 900 shown in FIG. 9. Further description is given below with reference to FIG. 11 and FIG. 12.

In this embodiment, according to an application identifier carried in a content request, an application indicated by the application identifier is learned, and it is learned that the content request is triggered by using the application. In this way, according to this embodiment, service quality applied to the application may be used when the foregoing content is returned.

In addition, according to this embodiment, by reporting, to a service quality control device, a service quality control request indicating traffic generated by requested content and the foregoing application, the traffic generated by the requested content may be counted into accumulated traffic of the application as traffic generated by the application, so as to implement update of the accumulated traffic of the application. In this way, the service quality control device may determine the service quality of the foregoing application according to the updated accumulated traffic, and return the determined service quality of the application to an access device.

Figure 11:
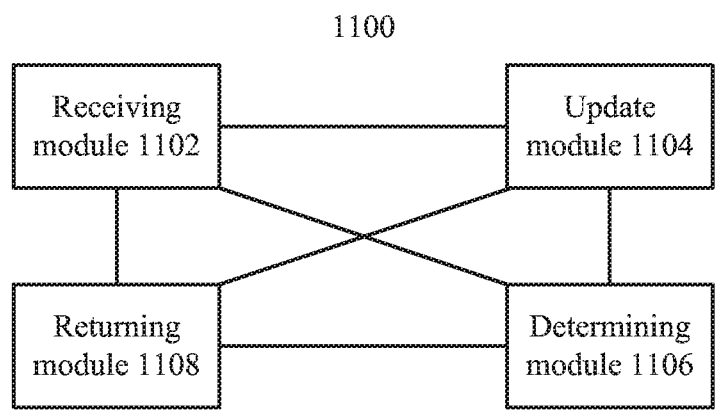
FIG. 11 is an exemplary schematic diagram of a logical structure of a service quality control device according to an embodiment.

FIG. 11 is an exemplary schematic diagram of a logical structure of a service quality control device 1100 according to an embodiment. The service quality control device 1100 shown in FIG. 11 is configured to determine service quality of an application, where a request for content is triggered by using the application. As shown in FIG. 11, the service quality control device 1100 includes a receiving module 1102, an update module 1104, a determining module 1106, and a returning module 1108. In addition, the content and the application described in this embodiment are the content and the application described in FIG. 1 to FIG. 6.

The receiving module 1102 is configured to receive a service quality control request that indicates traffic generated by the content and the application and that is sent by an access device.

The update module 1104 is configured to update accumulated traffic of the application by using the traffic as traffic generated by the application.

The determining module 1106 is configured to determine the service quality of the application according to the updated accumulated traffic.

The returning module 1108 is configured to return the determined service quality.

In a specific implementation process, the service quality control request is a CCR, and the application is indicated by an application parameter carried in the credit control request. The application parameter is a newly added parameter, and the parameter carries information used to indicate the application, such as the foregoing application identifier. It is not difficult to understand that because the application parameter is a newly added parameter, an existing credit control request needs to be modified.

In a specific implementation process, the returning module 1108 may return the updated service quality by using a credit control answer CCA.

The service quality control device 1100 shown in FIG. 11 is configured to execute the method 800 shown in FIG. 8. For the service quality control device and its operation, and technical details related to the service quality control device and its operation, description is also given in the method 700 shown in FIG. 7, the method 900 shown in FIG. 9, and the device 1000 shown in FIG. 10. Further description is given below with reference to FIG. 12.

According to this embodiment, by reporting, to a service quality control device, a service quality control request indicating traffic generated by requested content and the foregoing application, the traffic generated by the requested content may be counted into accumulated traffic of the application as traffic generated by the application, so as to implement update of the accumulated traffic of the application. In this way, the service quality control device may determine the service quality of the foregoing application according to the updated accumulated traffic, and return the determined service quality of the application to an access device.

Figure 12:
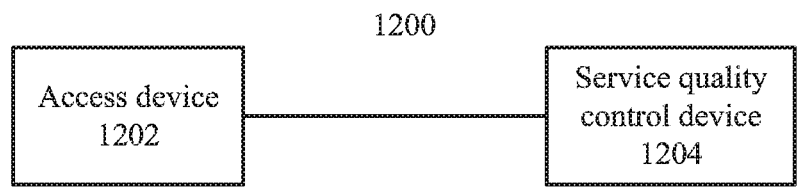
FIG. 12 is an exemplary schematic diagram of a logical structure of a service quality control system according to an embodiment.

FIG. 12 is an exemplary schematic diagram of a logical structure of a service quality control system 1200 according to an embodiment. As shown in FIG. 12, the service quality control system 1200 includes an access device 1202 and a service quality control device 1204.

The access device 1202 is configured to: receive a content request, where the content request carries a content identifier and an application identifier, the content identifier is used to identify requested content, and the application identifier is used to identify an application and identify that the content request is triggered by using the application; determine service quality corresponding to the application; and return the content according to the service quality.

The access device 1202 is further configured to: determine traffic generated by the content; send, to the service quality control device 1204, a service quality control request indicating the traffic and the application, so that the service quality control device 1204 updates accumulated traffic of the application by using the traffic as traffic generated by the application; and receive service quality that is of the application and that is determined by the service quality control device 1204 according to updated accumulated traffic of the application.

The service quality control device 1204 is configured to: receive the service quality control request that indicates the traffic generated by the content and the application and that is sent by the access device 1202; update the accumulated traffic of the application by using the traffic as the traffic generated by the application; and determine the service quality of the application according to the accumulated traffic, and return the determined service quality to the access device 1202.

Specifically, the service quality control request may be a CCR, and the application is indicated by a service identifier carried in the credit control request. In this case, the service identifier carries information used to indicate the application, such as the foregoing application identifier, instead of carrying information used to indicate the content, such as the foregoing content identifier.

In another implementation solution, the service quality control request is also a CCR. However, the application is indicated by an application parameter carried in the credit control request. The application parameter is a newly added parameter, and the parameter carries information used to indicate the application, such as the foregoing application identifier.

It can be learned that when the service quality control request is a CCR, the foregoing application may be indicated in the credit control request in two manners. A first manner is that the foregoing application is indicated by the service identifier carried in the credit control request, and a second manner is that the foregoing application is indicated by the application parameter carried in the credit control request. It is not difficult to understand that because the service identifier exists in an existing credit control request, the existing credit control request does not need to be modified in the first manner. However, in the second manner, because the application parameter is a newly added parameter, the existing credit control request needs to be modified.

In a specific implementation process, the service quality control device 1204 may return the determined service quality by using a credit control answer (CCA).

The access device 1202 is configured to execute the method 700 shown in FIG. 7. For the device and its operation, and specific details related to the device and its operation, description is also given in FIG. 8 to FIG. 11. Therefore, details are not described herein again.

The service quality control device 1204 is configured to execute the method 800 shown in FIG. 8. For the device and its operation, and specific details related to the device and its operation, description is also given in FIG. 7 and FIG. 9 to FIG. 11. Therefore, details are not described herein again.

In this embodiment, according to an application identifier carried in a content request, an application indicated by the application identifier is learned, and it is learned that the content request is triggered by using the application. In this way, according to this embodiment, service quality applied to the application may be used when the foregoing content is returned.

In addition, according to this embodiment, by reporting, to a service quality control device, a service quality control request indicating traffic generated by requested content and the foregoing application, the traffic generated by the requested content may be counted into accumulated traffic of the application as traffic generated by the application, so as to implement update of the accumulated traffic of the application. In this way, the service quality control device may determine the service quality of the foregoing application according to the updated accumulated traffic, and return the determined service quality of the application to an access device.

Figure 13:
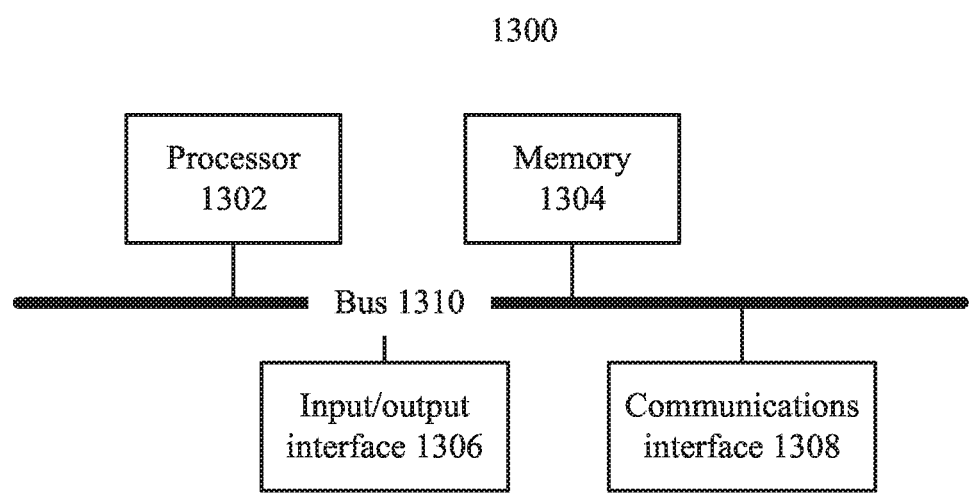
FIG. 13 is a schematic diagram of a hardware structure of an access device according to an embodiment.

FIG. 13 is a schematic diagram of a hardware structure of an access device 1300 according to an embodiment. As shown in FIG. 13, the access device 1300 includes a processor 1302, a memory 1304, an input/output interface 1306, a communications interface 1308, and a bus 1310. The processor 1302, the memory 1304, the input/output interface 1306, and the communications interface 1308 implement mutual communication connections by using the bus 1310.

The processor 1302 may be a general central processing unit (CPU), a microprocessor, an application-specific integrated circuit (ASIC), or one or more integrated circuits, and is configured to execute a related program, so as to implement the technical solution provided in this embodiment.

The memory 1304 may be a read-only memory (ROM), a static storage device, a dynamic storage device, or a random access memory (RAM). The memory 1304 may store an operating system and another application program. When the technical solutions provided in the embodiments are implemented by using software or firmware, program code used to implement the technical solutions provided in the embodiments is stored in the memory 1304, and executed by the processor 1302.

The input/output interface 1306 is configured to receive input data and information, and output data such as an operation result.

The communications interface 1308 uses a transceiver apparatus, for example, but not limited to, a transceiver, so as to implement communication between the access device 1300 and another device or communications network.

The bus 1310 may include a channel through which information is transmitted between parts (such as the processor 1302, the memory 1304, the input/output interface 1306, and the communications interface 1308) of the access device 1300.

It should be noted that although for the access device 1300, only the processor 1302, the memory 1304, the input/output interface 1306, the communications interface 1308, and the bus 1310 are shown in FIG. 13, in a specific implementation process, a person skilled in the art should understand that the access device 1300 further includes another component required for implementing normal operation. Furthermore, a person skilled in the art should understand that, according to a specific requirement, the access device 1300 may further include a hardware component that implements another additional function. In addition, a person skilled in the art should understand that the access device 1300 may include only components required for implementing the embodiments, and does not necessarily include all components shown in FIG. 13.

The hardware structure shown in FIG. 13 and the foregoing description are applicable to various access devices, charging devices, and service quality control devices provided in the embodiments. Based on the hardware structure shown in FIG. 13, an operation of each module in the access device shown in FIG. 4, the charging device shown in FIG. 5, the access device shown in FIG. 10, and the service quality control device shown in FIG. 11 should be understood as an operation implemented by each module by delivering a corresponding instruction to an appropriate hardware component in FIG. 13.

A person of ordinary skill in the art may understand that all or some of the steps of the foregoing methods may be implemented by a program instructing relevant hardware. The program may be stored in a computer-readable storage medium. The storage medium includes a ROM, a RAM, an optical disc, and the like.

To sum up, the foregoing descriptions are merely exemplary embodiments, but are not intended to limit the protection scope of the present embodiments. Any modification, equivalent replacement, or improvement made without departing from the principle of the present embodiments shall fall within the protection scope of the present embodiments.

What is claimed is:

1. A method comprising:
receiving, by an access device, a content request, sent from a requesting device, wherein the content request carries a content identifier and an application identifier, the content identifier identifies requested content hosted by a content provider, and the application identifier identifies a first application that originated the content request on the requesting device;
returning the content hosted by the content provider;
determining traffic generated by delivering the content hosted by the content provider to the first application on the requesting device; and
sending, to a charging device, a charging request indicating the traffic generated by delivering content hosted by the content provider to the first application on the requesting device and further indicating the first application which originated the content request, wherein the charging request is a credit control request (CCR), and the first application which originated the content request is indicated by at least one of a service identifier carried in the CCR or application parameter carried in the CCR, and wherein the CCR indicates that the traffic generated by delivering content hosted by the content provider to the first application on the requesting device is charged as traffic generated by the first application, wherein the CCR causes the traffic charged as being generated by the first application to be charged separately from traffic charged as being generated by accessing content hosted by the content provider from a second application.

2. The method according to claim 1, wherein the first application is indicated by an application parameter carried in the CCR.

3. The method according to claim 1, wherein the traffic generated by the first application is indicated by a used service unit (USU) carried in the CCR, and wherein a consumption record generated by the charging device indicates that the traffic is generated by delivering content hosted by the content provider to the first application on the requesting device, that the content is requested by the first application, and that the traffic is charged as the traffic generated by the first application.

4. The method according to claim 1, wherein the method further comprises:
determining a content source of the content;
the traffic is indicated by a used service unit (USU) carried in the CCR, and the CCR further carries a service identifier indicating the content source;
wherein a consumption record generated by the charging device indicates that the traffic is generated in response to the content source being accessed; and
wherein access to the content source is triggered by the first application.

5. A method comprising:
receiving, by a charging device, a charging request, from an access device, indicating a first application that originated a content request and traffic generated by delivering content hosted by a content provider to the first application on a requesting device, and
charging the traffic generated by delivering content hosted by the content provider to the first application on the requesting device as traffic generated by the first application, wherein traffic charged as being generated by the first application is charged separately from traffic charged as being generated by accessing content hosted by the content provider from a second application.

6. The method according to claim 5, wherein the charging request is a credit control request (CCR), and the first application is indicated by an application parameter carried in the CCR.

7. The method according to claim 6, wherein the traffic is indicated by a used service unit (USU) carried in the CCR, the CCR further carries a service identifier indicating the content, wherein the method further comprises:
generating a consumption record according to the first application, the content, and the traffic, wherein the consumption record indicates that the traffic is generated by delivering content hosted by the content provider to the first application on the requesting device, that the content is requested by the first application, and the traffic is charged as the traffic generated by the first application.

8. The method according to claim 6, wherein the traffic is indicated by a USU carried in the CCR, the CCR further carries a service identifier indicating a content source of the content, and wherein the method further comprises:
generating a consumption record according to the first application, the content source, and the traffic, wherein the consumption record indicates that the traffic is generated when the content source is accessed, wherein access to the content source is triggered by the first application, and wherein the traffic is charged as the traffic generated by the first application.

9. An access device, comprising:
a processor; and
a non-transitory computer readable storage medium storing a program for execution by the processor, the program including instructions to:
receive a content request, sent from a requesting device, wherein the content request carries a content identifier and an application identifier, wherein the content identifier identifies requested content hosted by a content provider, and wherein the application identifier identifies a first application that originated the content request in the requesting device;
return the content hosted by the content provider;
determine traffic generated by delivering the content hosted by the content provider to the first application on the requesting device; and
send, to a charging device, a charging request indicating the traffic generated by delivering the content hosted by the content provider to the first application on the requesting device and the first application which originated the content request, wherein the first application which originated the content request is indicated by a service identifier or application parameter carried in the charging request, and wherein the charging request indicates that the traffic generated by delivering the content hosted by the content provider to the first application on the requesting device is charged as traffic generated by the first application, wherein the charging requests causes traffic charged as being generated by the first application to be charged separately from traffic charged as being generated by accessing content hosted by the content provider from a second application.

10. The access device according to claim 9, wherein the charging request is a credit control request (CCR), and the first application is indicated by a service identifier carried in the CCR.

11. The access device according to claim 9, wherein the charging request is a CCR, and the first application is indicated by an application parameter carried in the CCR.

12. The access device according to claim 11, wherein the traffic is indicated by a used service unit (USU) carried in the CCR, and the CCR further carries a service identifier indicating the content, and wherein a consumption record generated by the charging device indicates that the traffic is generated by delivering content hosted by the content provider to the first application on the requesting device, that the content is requested by using the first application, and that the traffic is charged as the traffic generated by the first application.

13. The access device according to claim 11, wherein the instructions further comprise instructions to:
determine a content source of the content;
wherein the traffic is indicated by a used service unit (USU) carried in the CCR, and the CCR further carries a service identifier indicating the content source; and
wherein a consumption record generated by the charging device indicates that the traffic is generated in response to the content source being accessed, that access to the content source is triggered by the first application, and that the traffic is charged as the traffic generated by the first application.

14. A charging device, comprising:
a processor; and
a non-transitory computer readable storage medium storing a program for execution by the processor, the program including instructions to:
receive a charging request sent by an access device that indicates a first application that originated a content request and traffic generated by delivering content hosted by a content provider to a requesting device; and
charge the traffic as traffic generated by the first application, wherein traffic charged as being generated by the first application is charged separately from traffic charged as being generated by accessing content hosted by the content provider from a second application.

15. The charging device according to claim 14, wherein the charging request is a credit control request (CCR), and the first application is indicated by an application parameter carried in the CCR.

16. The charging device according to claim 15, wherein the traffic is indicated by a used service unit (USU) carried in the CCR, the credit control request further carries a service identifier indicating content, and wherein the instructions further comprise instructions to:
generate a consumption record according to the first application, the content, and the traffic, wherein the consumption record indicates that the traffic is generated by delivering content hosted by the content provider to the first application on the requesting device, that the content is requested by the first application, and that the traffic is charged as the traffic generated by the first application.

17. The charging device according to claim 15, wherein the traffic is indicated by a USU carried in the CCR, the CCR further carries a service identifier indicating a content source of the content, and the instructions further comprise instructions to:
generate a consumption record according to the first application, the content source, and the traffic, wherein the consumption record indicates that the traffic is generated in response to the content source being accessed, access to the content source is triggered by the first application, and the traffic is charged as the traffic generated by the first application.

18. A method comprising:
receiving, by an access device, a content request, sent from a requesting device, wherein the content request carries a content identifier and an application identifier, the content identifier identifies requested content hosted by a content provider, and the application identifier identifies a first application that originated the content request on the requesting device;
returning the content hosted by the content provider;
determining traffic generated by delivering the content hosted by the content provider to the first application on the requesting device; and
sending, to a charging device, a charging request indicating the traffic generated by delivering content hosted by the content provider to the first application on the requesting device and further indicating the first application which originated the content request, wherein the charging request is a credit control request (CCR), and the first application which originated the content request is indicated by at least one of a service identifier carried in the CCR or application parameter carried in the CCR, wherein the traffic generated by delivering content hosted by the content provider to the first application on the requesting device is charged as traffic generated by the first application according to the CCR, and wherein the traffic charged as being generated by the first application is charged separately from traffic charged as being generated by accessing content hosted by the content provider from a second application according to the CCR.

19. The method according to claim 18, wherein the first application is indicated by an application parameter carried in the CCR.

20. The method according to claim 18, wherein the traffic generated by the first application is indicated by a used service unit (USU) carried in the CCR, and wherein a consumption record generated by the charging device indicates that the traffic is generated by delivering content hosted by the content provider to the first application on the requesting device, that the content is requested by the first application, and that the traffic is charged as the traffic generated by the first application.

21. The method according to claim 18, wherein the method further comprises:
determining a content source of the content; and
the traffic is indicated by a used service unit (USU) carried in the CCR, and the CCR further carries a service identifier indicating the content source;
wherein a consumption record generated by the charging device indicates that the traffic is generated in response to the content source being accessed; and
wherein access to the content source is triggered by the first application.

22. An access device, comprising:
a processor; and
a non-transitory computer readable storage medium storing a program for execution by the processor, the program including instructions to:
receive a content request, sent from a requesting device, wherein the content request carries a content identifier and an application identifier, wherein the content identifier identifies requested content hosted by a content provider, and wherein the application identifier identifies a first application that originated the content request in the requesting device;
return the content hosted by the content provider;
determine traffic generated by delivering the content hosted by the content provider to the first application on the requesting device; and
send, to a charging device, a charging request indicating the traffic generated by delivering the content hosted by the content provider to the first application on the requesting device and the first application which originated the content request, wherein the first application which originated the content request is indicated by a service identifier or application parameter carried in the charging request, wherein the traffic generated by delivering the content hosted by the content provider to the first application on the requesting device is charged as traffic generated by the first application according to the charging request, and wherein traffic charged as being generated by the first application is charged separately from traffic charged as being generated by accessing content hosted by the content provider from a second application according to the charging request.

23. The access device according to claim 22, wherein the charging request is a CCR, and the first application is indicated by an application parameter carried in the CCR.

24. The access device according to claim 23, wherein the traffic generated by the first application is indicated by a used service unit (USU) carried in the CCR, and wherein a consumption record generated by the charging device indicates that the traffic is generated by delivering content hosted by the content provider to the first application on the requesting device, that the content is requested by the first application, and that the traffic is charged as the traffic generated by the first application.

25. The access device according to claim 23, wherein the instructions further comprise instructions for:
determining a content source of the content; and
the traffic is indicated by a used service unit (USU) carried in the CCR, and the CCR further carries a service identifier indicating the content source;
wherein a consumption record generated by the charging device indicates that the traffic is generated in response to the content source being accessed; and
wherein access to the content source is triggered by the first application.

* * * * *